US012663111B2

(12) United States Patent　　　　(10) Patent No.: US 12,663,111 B2
Engelland　　　　　　　　　　　　(45) Date of Patent: Jun. 23, 2026

(54) FLUID CONNECTION ASSEMBLY

(71) Applicant: Oetiker NY, Inc., Lancaster, NY (US)

(72) Inventor: Oliver Engelland, Eppstein (DE)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 19/177,523

(22) Filed: Apr. 12, 2025

(65) Prior Publication Data

US 2025/0237337 A1　　Jul. 24, 2025

Related U.S. Application Data

(62) Division of application No. 18/556,042, filed as application No. PCT/US2021/071029 on Jul. 28, 2021, now Pat. No. 12,305,785.

(51) Int. Cl.
　　*F16L 37/084*　　　(2006.01)
　　*F16L 37/088*　　　(2006.01)
(52) U.S. Cl.
　　CPC ....... *F16L 37/0841* (2013.01); *F16L 37/0885* (2019.08)
(58) Field of Classification Search
　　CPC .............. F16L 37/0841; F16L 37/0885; F16L 37/0887; F16L 37/0987; F16L 37/0915; F16L 37/1225; F16L 37/098; F16L 37/0982; F16L 37/0985; F16L 37/133
　　See application file for complete search history.

(56) References Cited

U.S. PATENT DOCUMENTS

| | | | | | |
|---|---|---|---|---|---|
| 2,004,967 | A | * | 6/1935 | Williams | |
| 4,332,402 | A | * | 6/1982 | Shellhause | .......... F16L 37/1225 |
| 4,735,440 | A | | 4/1988 | Sauer | |
| 4,756,558 | A | | 7/1988 | Beamer | |
| 5,054,743 | A | * | 10/1991 | Norkey | .............. F16L 37/0982 |
| 5,161,834 | A | * | 11/1992 | Norkey | .............. F16L 37/0987 |
| 5,257,833 | A | | 11/1993 | McNaughton | |
| 5,350,203 | A | | 9/1994 | McNaughton et al. | |
| 5,374,084 | A | | 12/1994 | Potokar | |
| 5,378,025 | A | * | 1/1995 | Szabo | ................. F16L 37/0982 |
| 5,533,761 | A | * | 7/1996 | Ostrander | .......... F16L 37/0982 |
| 5,538,297 | A | | 7/1996 | McNaughton | |
| 5,725,257 | A | | 3/1998 | Sakane | |
| 5,964,484 | A | | 10/1999 | Bartholomew | |
| 5,992,903 | A | | 11/1999 | Bartholomew | |
| 6,079,750 | A | | 6/2000 | Kacines | |

(Continued)

FOREIGN PATENT DOCUMENTS

| | | |
|---|---|---|
| CA | 2556467 | 2/2008 |
| EP | 1098127 | 5/2001 |

(Continued)

*Primary Examiner* — William S. Choi

(74) *Attorney, Agent, or Firm* — Harter Secrest & Emery LLP; Michael Nicholas Vranjes

(57)　　　　　　ABSTRACT

A retainer for a fluid connection assembly, including a cylindrical portion including a first end, a second end, a radially inward facing surface, and a radially outward facing surface, and a plurality of arm portions separated by circumferential spaces, each arm portion of the plurality of arm portions including a first member including a proximal end pivotably connected to the second end, the first member extending radially outward from the second end in a first axial direction, and a second member pivotably connected to a distal end of the first member.

20 Claims, 6 Drawing Sheets

(56)                        References Cited

U.S. PATENT DOCUMENTS

| | | | |
|---|---|---|---|
| 6,086,118 A | 7/2000 | McNaughton et al. | |
| 6,412,826 B1 | 7/2002 | Kulevsky et al. | |
| 6,471,252 B1* | 10/2002 | Moretti | F16L 37/098 |
| 6,517,120 B1 | 2/2003 | Miyajima et al. | |
| 6,655,491 B1* | 12/2003 | Stoll | F16L 37/0985 |
| 7,731,245 B2 | 6/2010 | Kerin et al. | |
| 7,770,938 B2* | 8/2010 | Bauer | F16L 37/0985 |
| 8,162,355 B2* | 4/2012 | Hall | F16L 37/0987 |
| 11,529,722 B2 | 12/2022 | Kujawski, Jr. et al. | |
| 2003/0094813 A1 | 5/2003 | Bucher et al. | |
| 2003/0218334 A1 | 11/2003 | Takayanagi | |
| 2006/0113792 A1* | 6/2006 | Weithorn | F16L 37/098 |
| 2008/0136163 A1 | 6/2008 | Okada | |
| 2015/0345684 A1 | 12/2015 | Kujawski, Jr. | |
| 2017/0114935 A1 | 4/2017 | Kujawski, Jr. et al. | |
| 2018/0266602 A1 | 9/2018 | Fremont | |

FOREIGN PATENT DOCUMENTS

| | | |
|---|---|---|
| EP | 3149381 | 4/2017 |
| GB | 2086514 | 5/1982 |

* cited by examiner

FLUID CONNECTION ASSEMBLY

CROSS-REFERENCE TO RELATED APPLICATIONS

This application is filed under 35 U.S.C. § 120 as a divisional of U.S. patent application Ser. No. 18/556,042, filed on Oct. 18, 2023, which application is the U.S. National Stage Application pursuant to 35 U.S.C. § 371 of International Patent Application No. PCT/US2021/071029, filed on Jul. 28, 2021, which applications are hereby incorporated by reference herein in their entireties.

FIELD

The present disclosure relates to fluid connectors, and, more particularly, to a fluid connection assembly including both a primary retaining clip and a secondary retainer that provides added securement or a backup securement device.

BACKGROUND

Fluid connectors, fluid connections, and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Another example of fluid traveling between components is oil being pumped to and/or from a turbocharger. Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, failure of such retaining clip is possible if installed improperly. Also, failure of such retaining clip is also possible in high fluid pressure situations.

Thus, there has been a long-felt need for a fluid connection assembly including a secondary retainer that can be arranged complementary to a retainer clip so as to provide added securement and/or a backup securement in case of failure of the retainer clip.

SUMMARY

According to aspects illustrated herein, there is provided a fluid connection assembly, comprising a connector body, including a first end, a second end, a through-bore, and a first radially outward facing surface comprising a groove, the groove including a second radially outward facing surface, at least one axial surface, and at least one aperture, a retaining clip arranged in the groove and operatively arranged to extend into the through-bore, and a secondary retainer, including a cylindrical portion comprising a third end, a fourth end, a radially inward facing surface, and a third radially outward facing surface, and at least one arm portion, comprising a first member pivotably connected to the fourth end, and a second member pivotably connected to the first member and operatively arranged to engage the groove to connect the secondary retainer to the connector body.

In some embodiments, the third end is operatively arranged to engage the retaining clip in the through-bore. In some embodiments, the first member extends from the fourth end radially outward in a first axial direction. In some embodiments, the second member extends from the first member radially inward in a second axial direction, opposite the first axial direction. In some embodiments, the at least one arm portion comprises a plurality of arm portions separated by circumferential spaces. In some embodiments, the first member and the second member are linear members. In some embodiments, the fluid connection assembly further comprises a curvilinear member connecting the first member with the fourth end. In some embodiments, the fluid connection assembly further comprises at least one third member extending radially outward from the third end, the at least one third member operatively arranged to engage the retaining clip. In some embodiments, the at least one third member is arranged perpendicular to the third radially outward facing surface. In some embodiments, the fluid connection assembly further comprises a tube including a shoulder and a fourth radially outward facing surface, wherein in a connected state of the fluid connection assembly, the retaining clip secures the tube in the connector body. In some embodiments, in a locked position of the secondary retainer, the radially inward facing surface engages the fourth radially outward facing surface.

According to aspects illustrated herein, there is provided a retainer for a fluid connection assembly, comprising a cylindrical portion including a first end, a second end, a radially inward facing surface, and a radially outward facing surface, a plurality of arm portions separated by circumferential spaces, each arm portion of the plurality of arm portions including a first member including a proximal end pivotably connected to the second end, the first member extending radially outward from the second end in a first axial direction, and a second member pivotably connected to a distal end of the first member.

In some embodiments, the second member extends radially inward from the distal end in a second axial direction, opposite the first axial direction. In some embodiments, the cylindrical portion comprises a constant diameter. In some embodiments, the cylindrical portion further comprises a circumferential gap forming a first circumferential end and a second circumferential end. In some embodiments, the cylindrical portion is elastically deformable. In some embodiments, the cylindrical portion further comprises a plurality of cutouts extending from the second end in the first axial direction, the plurality of cutouts being spaced apart circumferentially. In some embodiments, the retainer further comprises at least one third member extending radially outward from the first end. In some embodiments, the at least one third member comprises a plurality of third members spaced apart circumferentially, and each third member is arranged perpendicular to the radially outward facing surface. In some embodiments, the retainer further comprises a curvilinear member connecting the first member to the second end, wherein the first member and the second member are linear members.

According to aspects illustrated herein, there is provided a fluid connection assembly for use in a fluid connection, for example, for a turbocharger. The fluid connection assembly comprises a connector body, a retaining clip, a tube that is held within the connector body via the retaining clip, and a secondary retainer. The secondary retainer includes a cylindrical portion or an inner ring portion that engages the through-bore of the connector body to further hold the tube therein. The secondary retainer has one or more arm portions or an outer ring portion that is hingedly connected to the inner ring portion, the outer ring portion being engaged with an exterior groove of the connector body. In some embodiments, the outer ring portion is arranged at an acute angle with respect to the inner ring portion.

According to aspects illustrated herein, there is provided a retainer for a fluid connection assembly, comprising a cylindrical portion including a first end, a second end, a radially inward facing surface, and a radially outward facing surface, and at least one arm portion, including a first member including a proximal end pivotably connected to the second end, and a second member pivotably connected to a distal end of the first member.

In an exemplary embodiment, the first member extends radially outward from the second end in a first axial direction. In an exemplary embodiment, the second member extends radially inward from the distal end in a second axial direction, opposite the first axial direction. In an exemplary embodiment, the cylindrical portion comprises a constant diameter. In an exemplary embodiment, the cylindrical portion further comprises a circumferential gap forming a first circumferential end and a second circumferential end. In an exemplary embodiment, the cylindrical portion is elastically deformable. In an exemplary embodiment, the cylindrical portion further comprises a plurality of cutouts extending from the second end in the first axial direction, the plurality of cutouts being spaced apart circumferentially.

In an exemplary embodiment, the retainer further comprises at least one third member extending radially outward from the first end. In an exemplary embodiment, the at least one third member comprises a plurality of third members spaced apart circumferentially, and each third member is arranged perpendicular to the radially outward facing surface. In an exemplary embodiment, the retainer further comprises a curvilinear member connecting the first member to the second end, wherein the first member and the second member are linear members.

According to aspects illustrated herein, there is provided a fluid connection assembly, comprising a connector body including a groove, and a retainer, including a cylindrical portion comprising a first end, a second end, a radially inward facing surface, and a radially outward facing surface, and at least one arm portion, comprising a first member pivotably connected to the second end, and a second member pivotably connected to the first member and operatively arranged to engage the groove to connect the retainer to the connector body.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figures 1A, 1B:
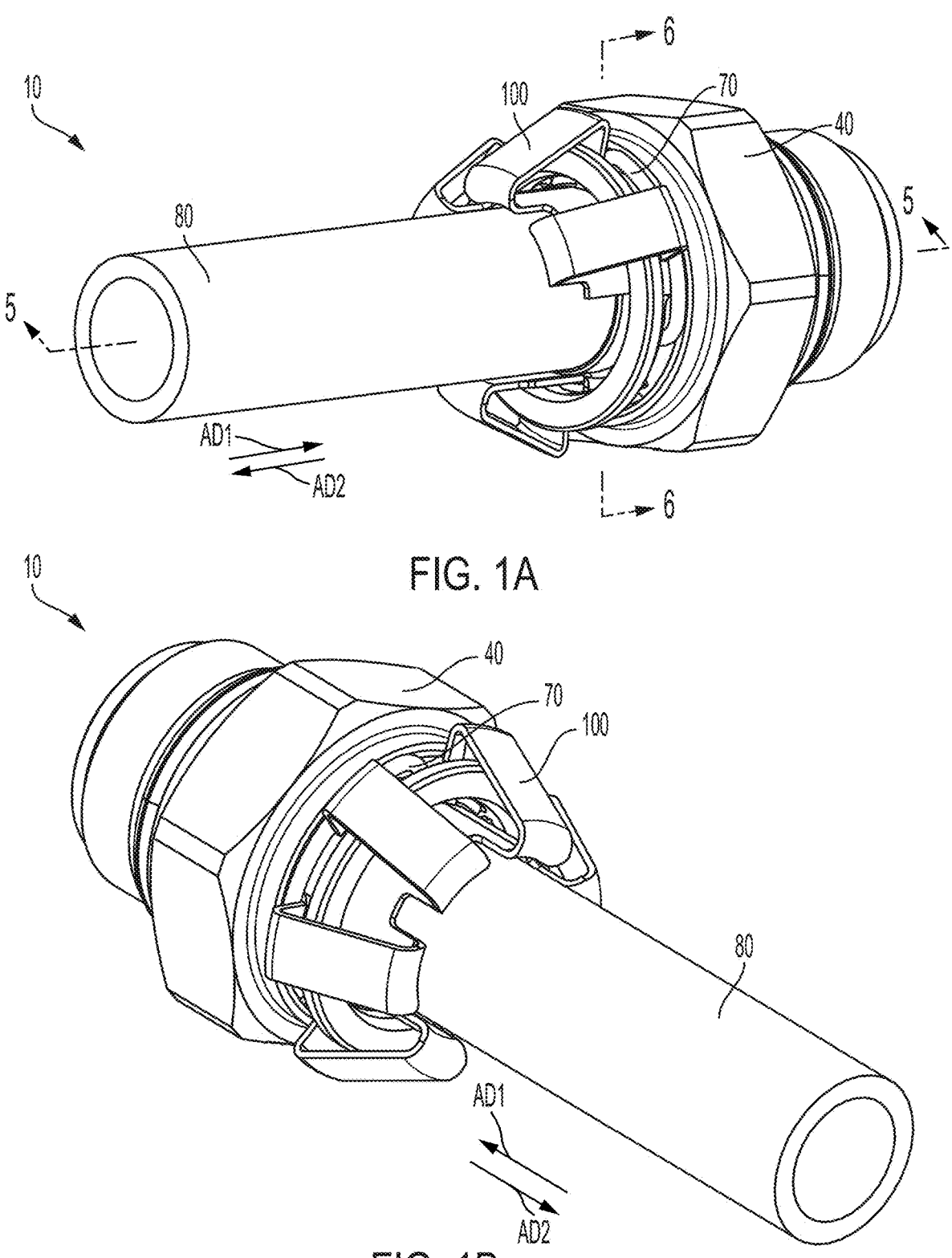
FIG. 1A is a front perspective view of a fluid connection assembly.
FIG. 1B is a rear perspective view of the fluid connection assembly shown in FIG. 1A.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 2:
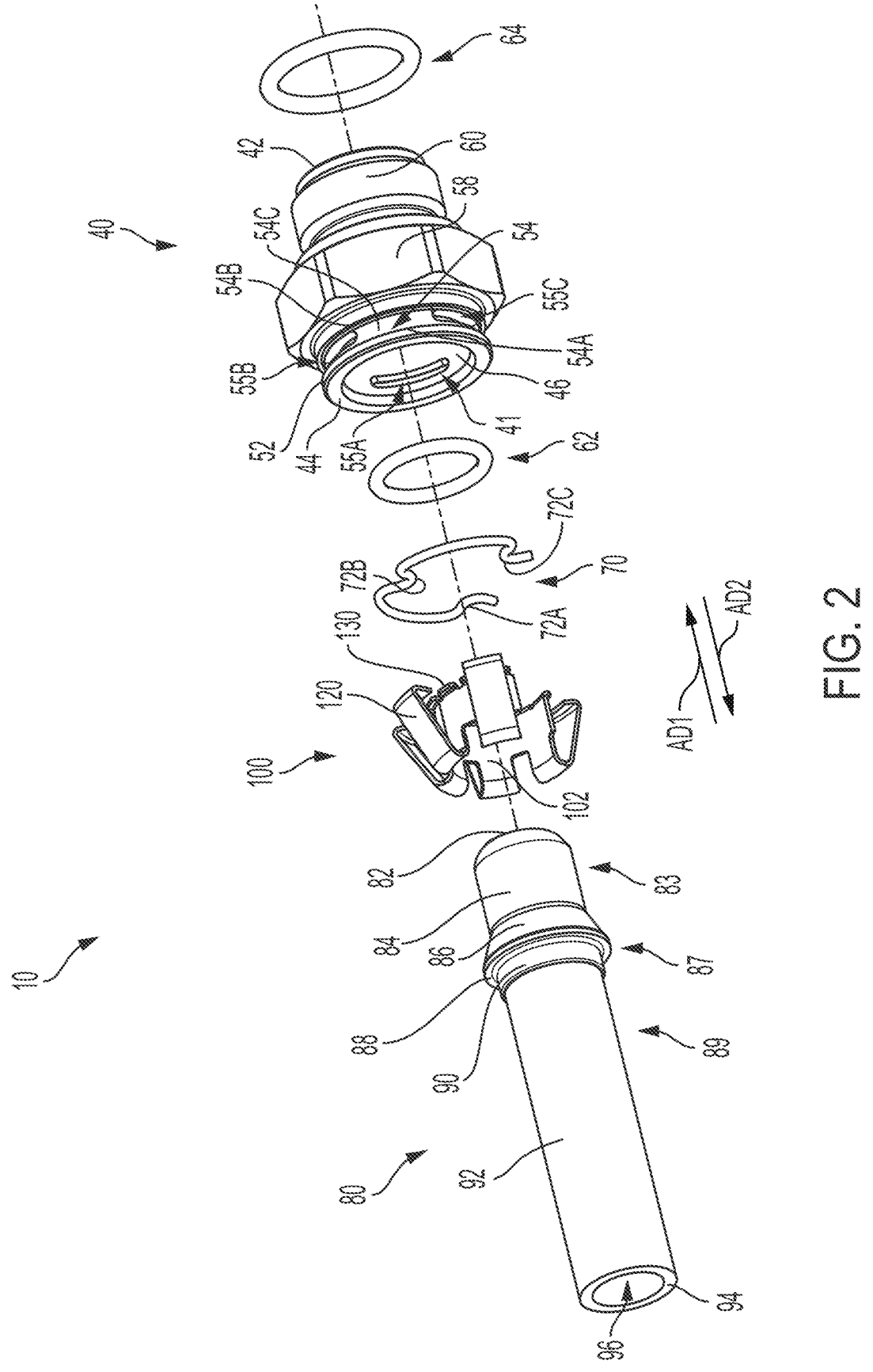
FIG. 2 is a front perspective exploded view of the fluid connection assembly shown in FIG. 1A.

Adverting now to the figures, FIG. 1A is a front perspective view of fluid connection assembly 10. FIG. 1B is a rear perspective view of fluid connection 10. FIG. 2 is a front perspective exploded view of fluid connection 10. Fluid connection assembly generally comprises connector body 40, retaining clip 70, tube 80, and secondary retainer 100. The following description should be read in view of FIGS. 1A-2.

Tube 80 comprises end 82, section 83, shoulder 87, section 89, end 94, and through-bore 96. Through-bore 96 extends through tube 80 from end 82 to end 94. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical or curvilinear taper proximate end 82 (see FIG. 5). In some embodiments, section 83 further comprises a raised section arranged between radially outward facing surface 84 and shoulder 87. Shoulder 87 is arranged between section 83 and section 89 and comprises radially outward facing surface 86 and surface 88. As shown, radially outward facing surface 86 is a frusto-conical surface extending from radially outward surface 84 to surface 88. Radially outward facing surface 86 increases in diameter is axial direction AD2. In some embodiments, radially outward facing surface 86 is an axial surface facing at least partially in axial direction AD1. In some embodiments, tube 80 comprises a constant diameter radially outward facing surface arranged between radially outward facing surface 86 and surface 88. Shoulder surface 88 is an axial surface facing at least partially in axial direction AD2. Section 89 is arranged between shoulder 87 and end 94 and comprises radially outward facing surface 92. Radially outward facing surface 92 includes a substantially constant diameter. In some embodiments, section 89 further comprises a raised section, namely, radially outward facing surface 90, arranged between shoulder surface 88 and radially outward facing surface 92. Radially outward facing surface 90 has a diameter that is greater than the diameter of radially outward facing surface 92.

Tube 80 is arranged to be inserted, specifically with end 82 first, into connector body 40, specifically through-bore 41. Tube 80 is inserted into connector body 40 until section 83, or radially outward facing surface 84, engages seal 62 (see FIG. 5), and shoulder 87 axially clears retaining clip 70

Figure 5:
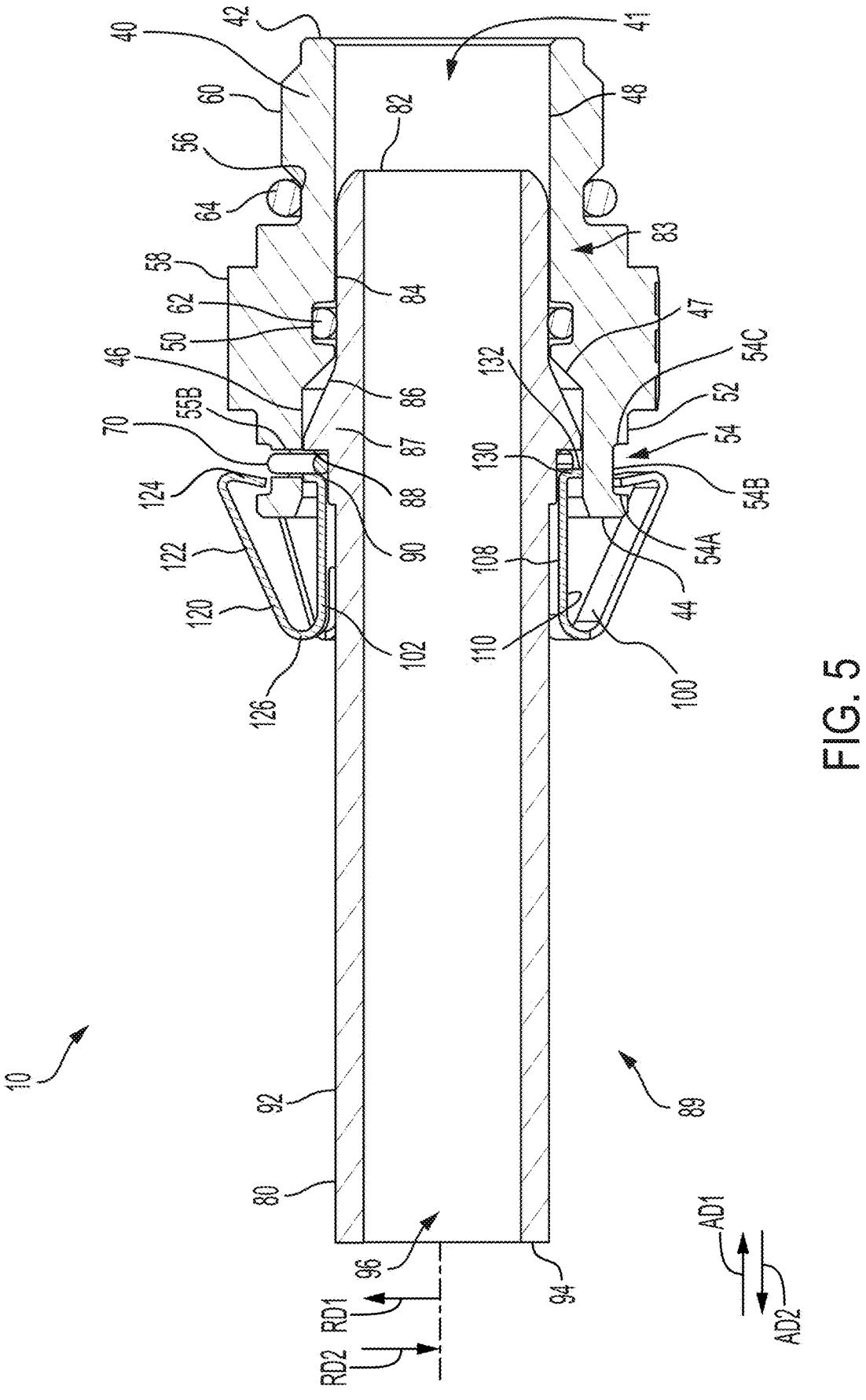
FIG. 5 is a cross-sectional view of the fluid connection assembly taken generally along line 5-5 in FIG. 1A.

(i.e., shoulder 87 is arranged on the right side of retaining clip 70 as shown in FIG. 5). It is the engagement of protrusions 72A-C with shoulder surface 88 that secures tube 80 within connector body 40. It should be appreciated that tube 80 may be any traditional tube or tube end form comprising a bead, radially outward extending protrusion or flange, or ramp profile, which extends radially outward and axially on the outer surface of the tube, to secure the tube within the connector body. In some embodiments, tube 80 comprises a metal. In some embodiments, tube 80 comprises a nonmetal (e.g., polymer, rubber, ceramic, etc.).

Figure 3A:
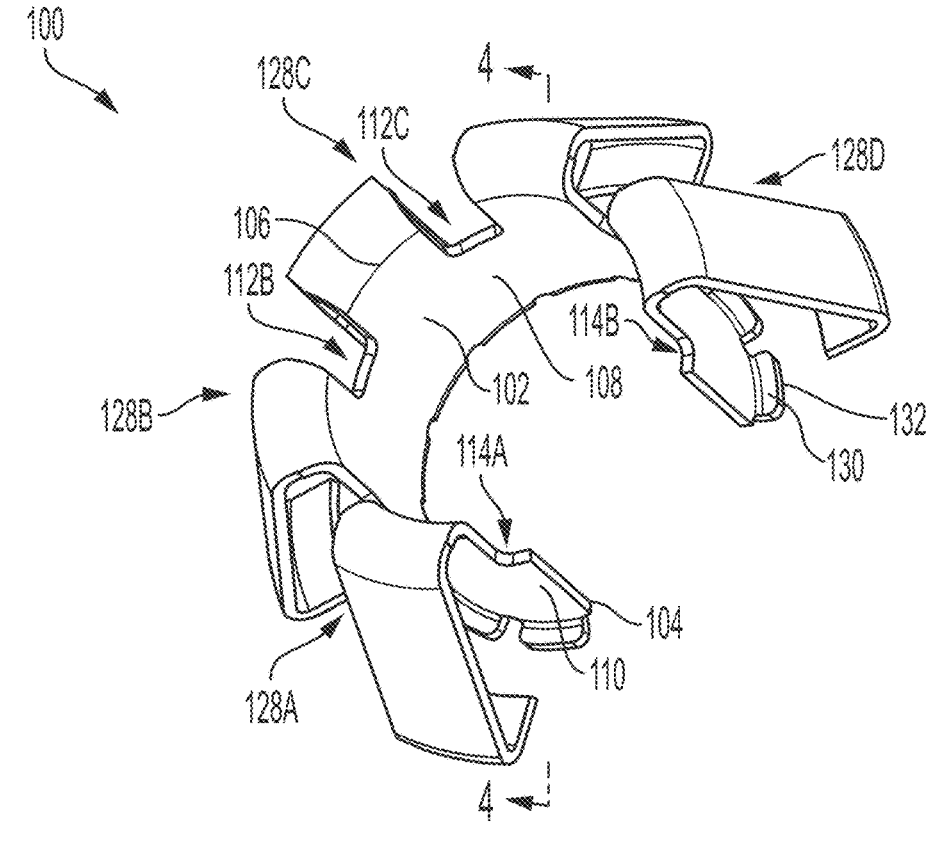
FIG. 3A is a front perspective view of the secondary retainer shown in FIG. 1A.
Figure 3B:
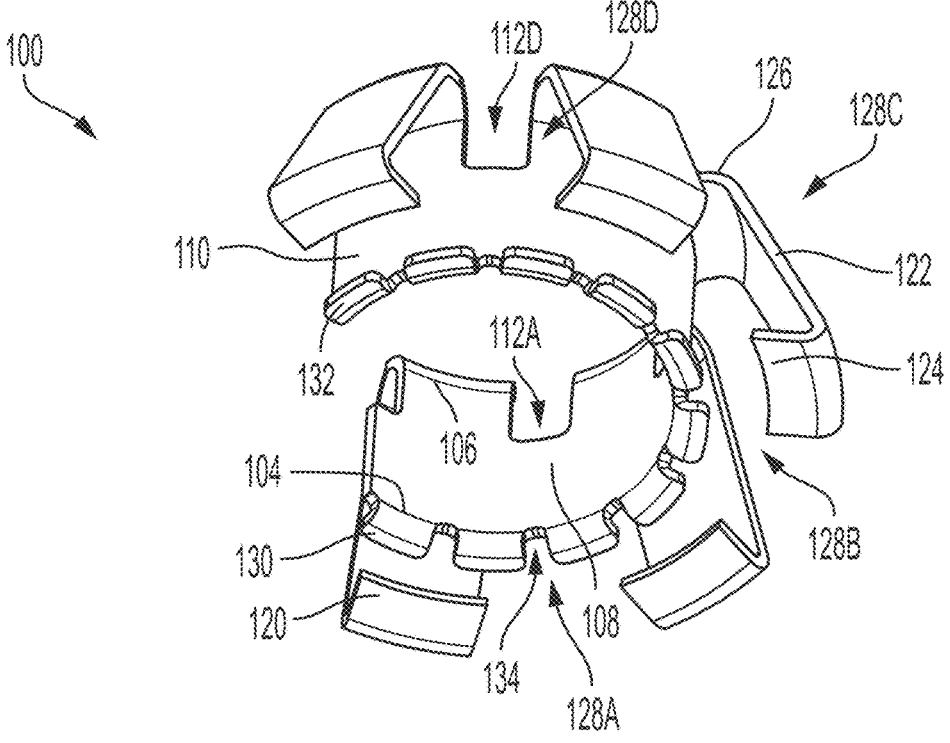
FIG. 3B is a rear perspective view of the secondary retainer shown in FIG. 3A.
Figures 3C, 4:
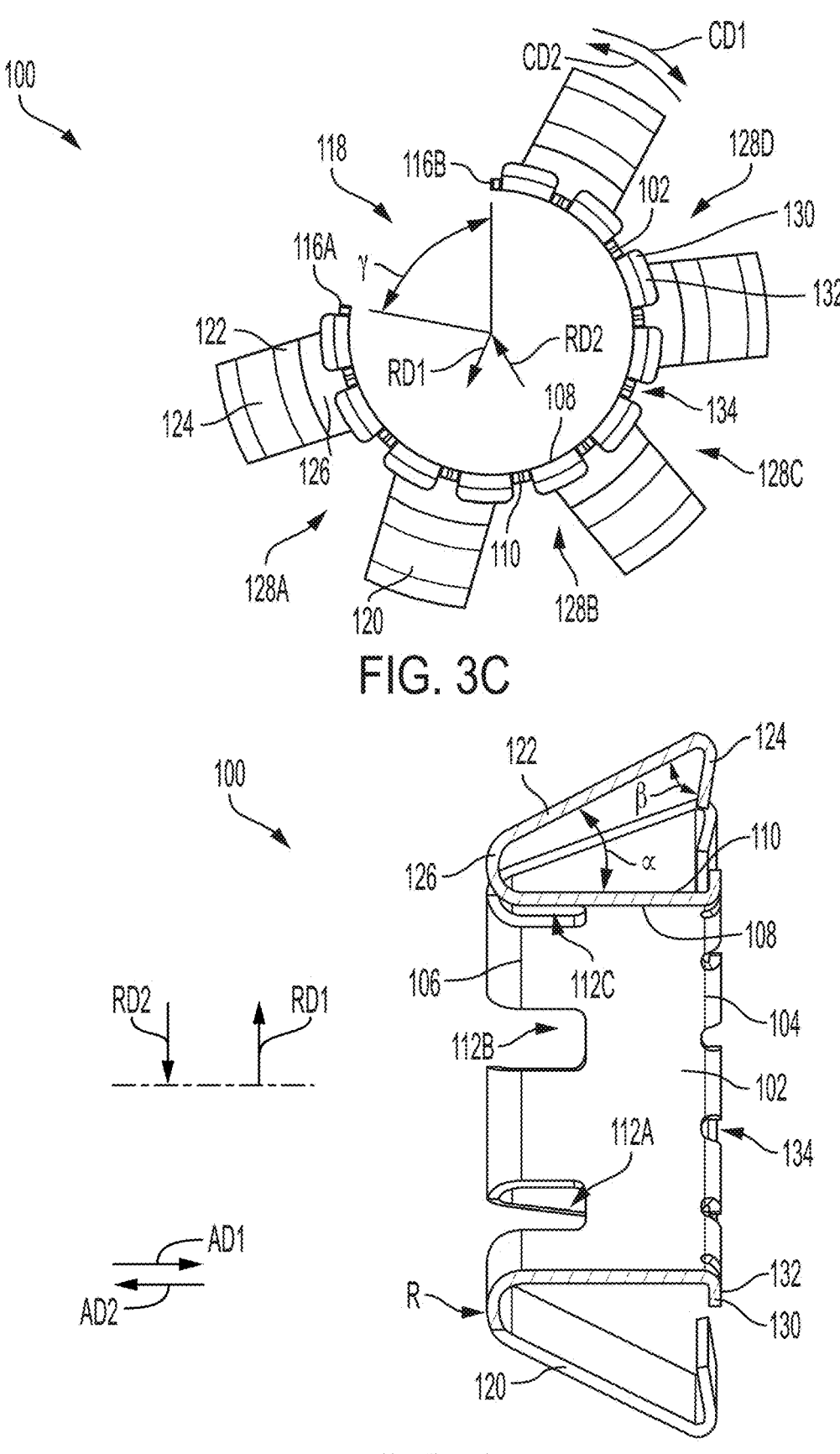
FIG. 3C is a rear elevational view of the secondary retainer shown in FIG. 3A.
FIG. 4 is a cross-sectional view of the secondary retainer taken generally along line 4-4 in FIG. 3A.
Figure 6:
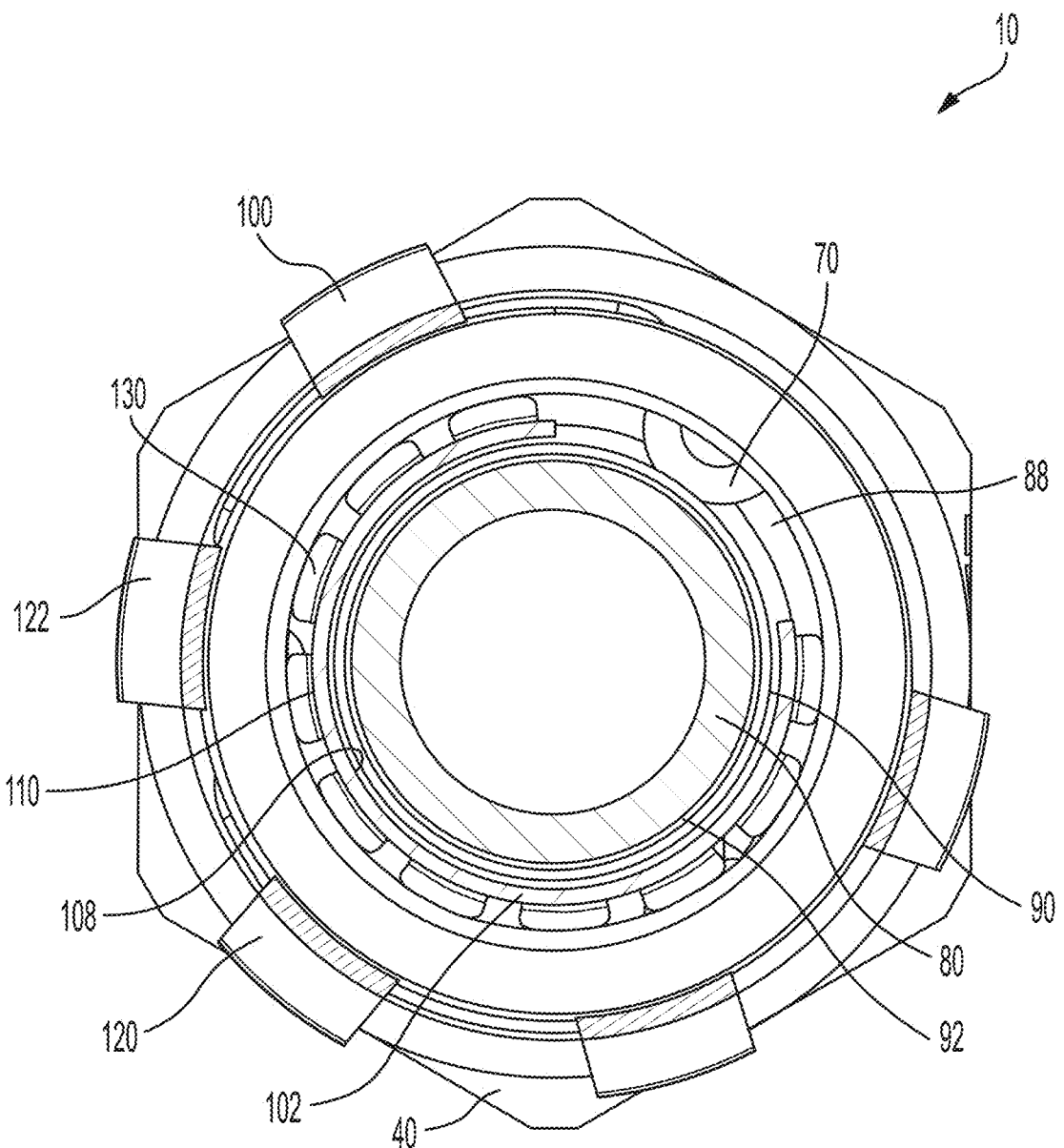
FIG. 6 is a cross-sectional view of the fluid connection assembly taken generally along line 6-6 in FIG. 1A.

FIG. 3A is a front perspective view of secondary 100. FIG. 3B is a rear perspective view of secondary retainer 100. FIG. 3C is a rear elevational view of secondary retainer 100. FIG. 4 is a cross-sectional view of secondary retainer 100 taken generally along line 4-4 in FIG. 3A. FIG. 5 is a cross-sectional view of fluid connection assembly 10 taken generally along line 5-5 in FIG. 1A. FIG. 6 is a cross-sectional view of fluid connection assembly 10 taken generally along line 6-6 in FIG. 1A. The following description should be read in view of FIGS. 1A-6.

Connector body 40 comprises through-bore 41 extending from end 42 to end 44, radially inward facing surface 46, radially inward facing surface 48, groove 50, radially outward facing surface 52, groove 54, head 58, and radially outward facing surface 60. Connector body 40 is arranged to be connected to a component that is filled with a fluid or through which fluid flows. For example, connector body 40 may be connected to a turbocharger, refrigeration compressor, or a transmission via radially outward facing surface 60, which may comprise external threading. Connector body 40 may be screwed into a threaded hole in the component via head 58 (e.g., using a wrench), which is then filled with oil, refrigerant, transmission fluid, coolant, etc. In some embodiments, head 58 is hexagonal; however, it should be appreciated that head 58 may comprise any geometry suitable for applying torque to connector body 40. Another component in which fluid connector 10, specifically connector body 40, may be installed into is a condenser, evaporator, or pump. It should be appreciated that fluid connection assembly 10 may be used in various other components, assemblies, and subassemblies in which fluid connection is desired. Radially outward facing surface 60 may further comprise groove 56. Seal or O-ring 64 is arranged in groove 56 to create a fluid tight seal between connector body 40 and the component it is connected to.

Seal 62 is arranged in connector body 40. Specifically, seal 62 is arranged in groove 50. Groove 50 is arranged in radially inward facing surface 48. In some embodiments, seal 62 is an O-ring. In some embodiments, radially inward facing surface 46 is a cylindrical surface that extends from end 44 to surface 47. Radially inward facing surface 46 is connected to radially inward facing surface 48 via surface 47. In some embodiments, surface 47 is a frusto-conical surface that connects generally cylindrical radially inward facing surface 46 with generally cylindrical radially inward facing surface 48. In some embodiments, surface 47 is an axial surface facing in axial direction AD2. In some embodiments, radially inward facing surface 48 is a cylindrical surface that extends from end 42 to surface 47.

Groove 54 is arranged in radially outward facing surface 52 and comprises axial surface 54A, radially outward facing surface 54B, and axial surface 54C. The diameter of radially outward facing surface 54B is less than the diameter of radially outward facing surface 52. Surface 54A extends radially outward from radially outward facing surface 54B and faces in axial direction AD1. Surface 54C extends radially outward from radially outward facing surface 54B and faces in axial direction AD2. In some embodiments, surfaces 54A and 54C are parallel. Groove 54 is arranged axially between end 44 and head 58. In some embodiments, groove 54 is arranged immediately adjacent to head 58. Groove 54 further comprises apertures 55A-C arranged circumferentially thereabout. Apertures 55A-C extend from radially outward facing surface 54B to through-bore 41. Groove 54 is operatively arranged to engage retaining clip 70 and secondary retainer 100, as will be described in greater detail below. In some embodiments, connector body 40 comprises a metal. In some embodiments, connector body 40 comprises a nonmetal (e.g., polymer, ceramic, rubber).

Retaining clip or retaining ring or snap clip/ring 70 is arranged in groove 54 in body 40. Retaining clip 70 is generally ring-shaped including one or more protrusions extending radially inward. In the embodiment shown, retaining clip 70 comprises protrusions 72A-C. Protrusions 72A-C extend radially inward through apertures 55A-C in groove 54. Protrusions 72A-C are arranged to engage shoulder 87, specifically, surface 88, to secure tube 80 within connector body 40. Retaining clip 70 may comprise any material that is capable of elastically deforming and returning to its original shape (e.g., metal, polymer, etc.).

Secondary retainer 100 generally comprises cylindrical portion 102 and at least one arm portion 120, and is operatively arranged to engage connector body 40, tube 80, and retaining clip 70. Cylindrical portion 102 is arranged at least partially within connector body 40 and arm portion 120 is arranged outside of connector body 40. Cylindrical portion 102 includes end 104, end 106, radially inward facing surface 108, and radially outward facing surface 110. In some embodiments, and as shown, cylindrical portion 102, namely, radially inward facing surface 108 and radially outward facing surface 110, comprises a constant diameter. Cylindrical portion 102 is operatively arranged to engage tube 80 and retainer 70. Specifically, end 104 is arranged to engage retainer 70 and radially inward facing surface 108 is arranged to engage tube 80. In some embodiments, cylindrical portion 102 comprises a variable diameter. In some embodiments, cylindrical portion 102 comprises one or more cutouts or apertures, for example, four cutouts 112A-D, extending from end 106 in axial direction AD1. Cutouts 112A-D extend radially through cylindrical portion 102 from radially outward facing surface 110 to radially inward facing surface 108. In some embodiments, and as shown, cutouts 112A-D are spaced from each other in a circumferential direction and circumferentially separate arm members 120. In some embodiments, cylindrical portion 102 further comprises cutouts 114A-B arranged proximate ends 116A-B, respectively, and extending from end 106 in axial direction AD1. Cutouts 114A-B extend radially through cylindrical portion 102 from radially outward facing surface 110 to radially inward facing surface 108.

Cylindrical portion 102 further comprises circumferential gap 118 which forms circumferential end 116A and circumferential end 116B. As best shown in FIG. 3C, circumferential gap 118 can be measured by angle γ which indicates the angle between end 116A and end 116B. In some embodiments, angle γ is 75 degrees. Circumferential gap 118 allows cylindrical portion 102 to be elastic and assembled radially on tube 80. For example, as secondary retainer 100 is arranged radially on tube 80 (i.e., tube 80 moves through gap 118), cylindrical portion 102 may expand in a radially outward direction (i.e., increase in diameter) and then, once properly arranged on tube 80, contract back to its original diameter. Furthermore, the expandability of cylindrical portion 102 further allows cylindrical portion 102 to fit snugly around tube 80. If the diameter of tube 80 (e.g., radially outward facing surface 92 or radially outward facing surface 90) is greater than the diameter of radially inward facing surface 108, then once assembled, secondary retainer 100 will frictionally engage tube 80, which will prevent chatter between the components.

In some embodiments, secondary retainer 100 further comprises one or more members 130. Member 130 extends radially outward from radially outward facing surface 110 in radial direction RD1. Member 130 comprises axial surface 132 that faces in axial direction AD1. In some embodiments, surface 132 is arranged perpendicular to radially outward facing surface 110. In some embodiments, surface 132 is arranged nonperpendicular to radially outward facing surface 110. In some embodiments, secondary retainer 100 comprises a plurality of members 130 separated circumferentially by spaces 134.

Arm portion or portions 120 are pivotably connected to cylindrical portion 102. In some embodiments, and as shown, secondary retainer 100 comprises a plurality of arm portions, for example, five arm portions 120, separated by circumferential spaces 128A-D. In some embodiments, arm portions 120 may also be separated by cutouts 112A-D. Each of arm portions 120 comprises member 122 and member 124. Member 122, at its proximal end, extends from end 106 radially outward in radial direction RD1 and in axial direction AD1. In some embodiments, and as shown, member 122 is a linear member arranged at angle α with respect to radially outward facing surface 110. In some embodiments, angle α is 25 degrees. In some embodiments, arm portion 120 further comprises curvilinear member 126 that connects member 122 to end 106. Curvilinear member 126 comprises radius R.

Member 124 extends from the distal end of member 122 radially inward in radial direction RD2 and in axial direction AD2. In some embodiments, and as shown, member 124 is a linear member arranged at angle β with respect to member 122. In some embodiments, angle β is 55 degrees. Member 124 and member 122 essentially form a hook that is arranged to engage connector body 40. Specifically, member 124 is arranged to engage groove 54 to secure secondary retainer 100 to connector body 40. Arm portions 120 are operatively arranged to displace radially outward when engaging radially outward facing surface 52 of connector body and then return back to their original position when engaged with groove 54 (i.e., arm portions 120 are elastic).

To assemble fluid connection assembly 10, retaining clip 70 is arranged on connector body 40 such that it is engaged with groove 54 and protrusions 72A-C are engaged with apertures 55A-C and protrude into through-bore 41 (see FIGS. 5-6). Tube 80 is then inserted in axial direction AD1, with end 82 first, into connector body 40. Radially outward facing surface 84 engages seal 62 and section 83 is arranged inside of connector body 40 proximate radially inward facing surface 48. As shoulder 87 engages protrusions 72A-C, retaining clip 70 expands radially outward in radial direction RD1. Once shoulder 87 clears protrusions 72A-C (i.e., is arranged axially between protrusions 72A-C and surface 47), protrusions 72A-C snap back radially inward in radial direction RD2 to form the connected state. In the connected state, shoulder 87 engages or is arranged proximate surface 47 and/or surface 46. Surface 47 prevents shoulder 87 and thus tube 80 from displacing in axial direction AD1, and protrusions 72A-C prevent shoulder 87 and thus tube 80 from displacing in axial direction AD2 with respect to connector body 40. As such, the engagement of retainer 70 with connector body 40 and tube 80 prevents displacement of tube 80 in axial directions AD1 and AD2, as well as radial directions RD1 and RD2, relative to connector body 40.

Next, secondary retainer 100 is arranged on tube 80 such that end 104 (i.e., member 130) faces toward shoulder 87 and end 106 faces away from shoulder 87. It should be appreciated that secondary retainer 100 can be arranged on tube 80 prior to insertion of tube 80 into connector body. As previously described, secondary retainer 100 is assembled radially onto tube 80, namely, radially outward facing surface 92, through circumferential gap 118 such that radially inward facing surface 108 engages radially outward facing surface 92. During such assembly (i.e., as radially outward facing surface 92 passes through circumferential gap 118) cylindrical portion 102 may elastically expand or increase in diameter. Once tube 80 is properly secured in connector body 40, via retaining clip 70 as previously described, secondary retainer 100 is then displaced along tube 80 in axial direction AD1. As secondary retainer 100 engages end 44, the angle of members 124 cause arm portions 120 to expand radially outward in radial direction RD1. Arm portions 120 remain in the expanded stated until members 124 are aligned with groove 54, at which point arm portions 120 snap back in to the original position. This is the locked position of secondary retainer 100.

In the locked position of secondary retainer 100: 1) members 124 are engaged with groove 54, specifically radially outward facing surface 54B and/or axial surface 54A; 2) radially inward facing surface 108 is engaged with tube 80, specifically radially outward facing surface 90 and/or radially outward facing surface 92; and/or 3) end 104, specifically surfaces 132 of members 130, is engaged with retaining clip 70. In some embodiments, in the locked position, a radially outward facing surface of members 130 engages radially inward facing surface 46, which prevents or inhibits debris from entering connector body 40. As such, secondary retainer 100 provides added retaining force to retaining clip 70 since it provides axial force in axial direction AD1 to protrusions 70A-C within through-bore 41 of connector body 40. Such axial force on retaining clip 70 prevents chatter between elements. Also, if retaining clip 70 were to fail due to improper assembly or excessive force, secondary retainer 100 would prevent tube 80 from being ejected from connector body 40.

To unlock fluid connection assembly 10, engaged arm portions 120 must be displaced radially outward to disengage members 124 from groove 54, at which point secondary retainer 100 is displaced in axial direction AD2 and removed from connector body 40 (and optionally removed from tube 80 as well). Then retaining clip 70 is expanded radially until protrusions 72A-C radially clear and disengage from shoulder 87, at which point tube 80 is displaced in axial direction AD2 and removed from connector body 40. Retaining clip 70 may optionally be completely removed from connector body 40.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Fluid connection assembly
40 Connector body
41 Through-bore
42 End
44 End
46 Radially inward facing surface
47 Radially inward facing surface
48 Radially inward facing surface
50 Groove
52 Radially outward facing surface
54 Groove
54A Surface
54B Surface
54C Surface
55A Aperture
55B Aperture
55C Aperture
56 Groove
58 Head
60 Radially outward facing surface
62 Seal
64 Seal
70 Retaining clip
72A Protrusion
72B Protrusion
72C Protrusion
80 Tube
82 End
83 Section
84 Radially outward facing surface
86 Radially outward facing surface
87 Shoulder
88 Surface
89 Section
90 Radially outward facing surface
92 Radially outward facing surface
94 End
96 Through-bore
100 Secondary retainer
102 Cylindrical portion
104 End
106 End
108 Radially inward facing surface
110 Radially outward facing surface
112A Cutout
112B Cutout
112C Cutout
112D Cutout
114A Cutout
114B Cutout
116A End
116B End
118 Gap
120 Arm portion
122 Member
124 Member
126 Member
128A Space
128B Space
128C Space
128D Space
130 Member
132 Surface
134 Space or spaces
AD1 Axial direction
AD2 Axial direction
CD1 Circumferential direction
CD2 Circumferential direction
R Radius RD1 Radial direction
RD2 Radial direction
α Angle
β Angle
γ Angle

What is claimed is:

1. A retainer for a fluid connection assembly, comprising:
a cylindrical portion including:
    a first end;
    a second end;
    a radially inward facing surface; and
    a radially outward facing surface; and
a plurality of arm portions separated by circumferential spaces, each arm portion of the plurality of arm portions including:
    a first member including a proximal end pivotably connected to the second end, the first member extending radially outward from the second end in a first axial direction at a first acute angle; and
    a second member pivotably connected to a distal end of the first member, the second member arranged at a second acute angle with respect to the first member, the second acute angle being greater than the first acute angle.

2. The retainer as recited in claim 1, wherein the second member extends radially inward from the distal end in a second axial direction, opposite the first axial direction.

3. The retainer as recited in claim 1, wherein the cylindrical portion comprises a constant diameter.

4. The retainer as recited in claim 1, wherein the cylindrical portion further comprises a circumferential gap forming a first circumferential end and a second circumferential end.

5. The retainer as recited in claim 4, wherein the cylindrical portion is elastically deformable.

6. The retainer as recited in claim 1, wherein the cylindrical portion further comprises a plurality of cutouts extending from the second end in the first axial direction, the plurality of cutouts being spaced apart circumferentially.

7. The retainer as recited in claim 1, further comprising at least one third member extending radially outward from the first end.

8. The retainer as recited in claim 7, wherein:
the at least one third member comprises a plurality of third members spaced apart circumferentially; and
each third member is arranged perpendicular to the radially outward facing surface.

9. The retainer as recited in claim 1, further comprising a curvilinear member connecting the first member to the second end, wherein the first member and the second member are linear members.

10. A retainer for a fluid connection assembly, comprising:
a cylindrical portion including:
    a first end;
    a second end;

a radially inward facing surface; and
    a radially outward facing surface; and
at least one arm portion, including:
    a first member including a proximal end pivotably connected to the second end;
    a second member pivotably connected to a distal end of the first member; and
    at least one third member extending radially outward from the first end.

11. The retainer as recited in claim 10, wherein the first member extends radially outward from the second end in a first axial direction.

12. The retainer as recited in claim 11, wherein the second member extends radially inward from the distal end in a second axial direction, opposite the first axial direction.

13. The retainer as recited in claim 10, wherein the cylindrical portion comprises a constant diameter.

14. The retainer as recited in claim 10, wherein the cylindrical portion further comprises a circumferential gap forming a first circumferential end and a second circumferential end.

15. The retainer as recited in claim 14, wherein the cylindrical portion is elastically deformable.

16. The retainer as recited in claim 10, wherein the cylindrical portion further comprises a plurality of cutouts extending from the second end in the first axial direction, the plurality of cutouts being spaced apart circumferentially.

17. The retainer as recited in claim 10, wherein:
the at least one third member comprises a plurality of third members spaced apart circumferentially; and
each third member is arranged perpendicular to the radially outward facing surface.

18. The retainer as recited in claim 10, further comprising a curvilinear member connecting the first member to the second end, wherein the first member and the second member are linear members.

19. A fluid connection assembly, comprising:
a connector body including a groove; and
a retainer, including:
    a cylindrical portion comprising:
    a first end;
    a second end;
    a radially inward facing surface; and
    a radially outward facing surface; and
at least one arm portion, comprising:
    a first member pivotably connected to the second end, the first member forming a frusto-conical surface; and
    a second member pivotably connected to the first member and operatively arranged to engage the groove to connect the retainer to the connector body.

20. The retainer as recited in claim 19, further comprising at least one third member extending radially outward from the first end.

* * * * *